US009421523B2

(12) United States Patent
Naeemi et al.

(10) Patent No.: US 9,421,523 B2
(45) Date of Patent: Aug. 23, 2016

(54) PROCESSES FOR PRODUCING CONTROLLED POROUS CATALYSTS FOR THE DEHYDROGENATION OF ORGANIC COMPOUNDS

(71) Applicant: Asemblon Inc., Woodinville, WA (US)

(72) Inventors: Esmaeel Naeemi, Woodinville, WA (US); David O'Connor, Woodinville, WA (US)

(73) Assignee: Asemblon, Inc., Woodinville, WA (US)

( * ) Notice: Subject to any disclaimer, the term of this patent is extended or adjusted under 35 U.S.C. 154(b) by 415 days.

(21) Appl. No.: 14/109,677

(22) Filed: Dec. 17, 2013

(65) Prior Publication Data

US 2014/0187416 A1    Jul. 3, 2014

Related U.S. Application Data

(63) Continuation-in-part of application No. 13/442,719, filed on Apr. 9, 2012, now abandoned.

(60) Provisional application No. 61/472,956, filed on Apr. 7, 2011.

(51) Int. Cl.

| B01J 23/00 | (2006.01) |
|---|---|
| B01J 23/75 | (2006.01) |
| B01J 37/12 | (2006.01) |
| B01J 37/34 | (2006.01) |
| B01J 37/04 | (2006.01) |
| B01J 37/08 | (2006.01) |
| B01J 35/02 | (2006.01) |
| B01J 37/00 | (2006.01) |
| B01J 35/10 | (2006.01) |

(52) U.S. Cl.
CPC .............. *B01J 23/75* (2013.01); *B01J 35/023* (2013.01); *B01J 35/1004* (2013.01); *B01J 37/0018* (2013.01); *B01J 37/04* (2013.01); *B01J 37/082* (2013.01); *B01J 37/12* (2013.01); *B01J 37/349* (2013.01)

(58) Field of Classification Search
CPC .... B01J 23/75; B01J 35/1004; B01J 35/023; B01J 37/082; B01J 37/04; B01J 37/0018; B01J 37/12; B01J 37/349
USPC ........................................................ 502/335
See application file for complete search history.

(56) References Cited

U.S. PATENT DOCUMENTS 4,917,857 A * 4/1990 Jaeckel .................... B01J 35/08
                                                    264/45.3

* cited by examiner

*Primary Examiner* — Colleen Dunn
*Assistant Examiner* — Haytham Soliman

(57) ABSTRACT

The current document is directed to processes for producing improved porous catalysts for the dehydrogenation of organic compounds. In one implementation, the process comprises providing a powder of metal particles, sieving the powder using vibrating-screen sieves, aligning metal particles collected from sieving under an external magnetic field, partially sintering the aligned metal particles to form a solid matrix by heating the aligned metal particles in a furnace or microwave oven, or heating the aligned metal particles using a laser sintering process with a controlled amount of external heat, to a temperature below the melting point of the metal powder, and oxidizing the matrix to produce the porous catalyst. The catalysts produced by the disclosed methods have a porous body with increased surface area, can assume various microstructures, and consist essentially of metal oxides.

6 Claims, 5 Drawing Sheets

PROCESSES FOR PRODUCING CONTROLLED POROUS CATALYSTS FOR THE DEHYDROGENATION OF ORGANIC COMPOUNDS

CROSS-REFERENCE TO RELATED APPLICATION

This application is a continuation-in-part of application Ser. No. 13/442,719, filed on Apr. 9, 2012, which claims the benefit of Provisional Application No. 61/472,956, filed Apr. 7, 2011.

TECHNICAL FIELD

The current application is related to catalytic dehydrogenation of organic compounds and, in particular, to a process for producing controlled porous catalysts for the dehydrogenation of organic compounds.

BACKGROUND

Dehydrogenation reactions are endothermic reactions, so energy must be added to release hydrogen. There are two characteristics often associated with dehydrogenation reactions: (1) the forward reaction is thermodynamically unfavorable; and (2) a significant amount of thermal energy needs to be supplied to the endothermic reaction for the reaction to proceed to completion. Catalysts are commonly used to improve reaction rates and lower the activation energy of dehydrogenation reactions so that they become economically feasible in industrial applications.

Catalytic dehydrogenation is a desired functionalization method for a variety of industrially important processes. Current dehydrogenation methods using stoichiometric oxidizing agents often generate large amounts of toxic byproducts and often suffer from poor catalytic activity and selectivity.

SUMMARY

The current document is directed to processes for producing porous catalysts for the dehydrogenation of organic compounds. The processes disclosed in the current document are employed to produce porous catalysts with improved properties, including large accessible surface area and high levels of porosity, which, in turn, increase the catalytic efficiency and hydrogen uptake of dehydrogenation reactions catalyzed by the porous catalysts. In one implementation, the process comprises providing a powder of metal particles, sieving the powder using vibrating-screen sieves, aligning metal particles collected from sieving under an external magnetic field, partially sintering the aligned metal particles to form a solid matrix by heating the aligned metal particles in a furnace or microwave oven, or heating the aligned metal particles using a laser sintering process with a controlled amount of external heat, to a temperature below the melting point of the metal powder, and oxidizing the matrix to produce the porous catalyst. In another implementation, spacer spheres may be added to the metal powder to reduce mobility of the metal particles and to further create inter-particle spacing, with the spacer spheres removed in subsequent processing steps. The catalysts produced by the disclosed methods have a porous body with increased surface area, can assume various microstructures, and consist essentially of metal oxides.

DETAILED DESCRIPTION

Figure 1A:
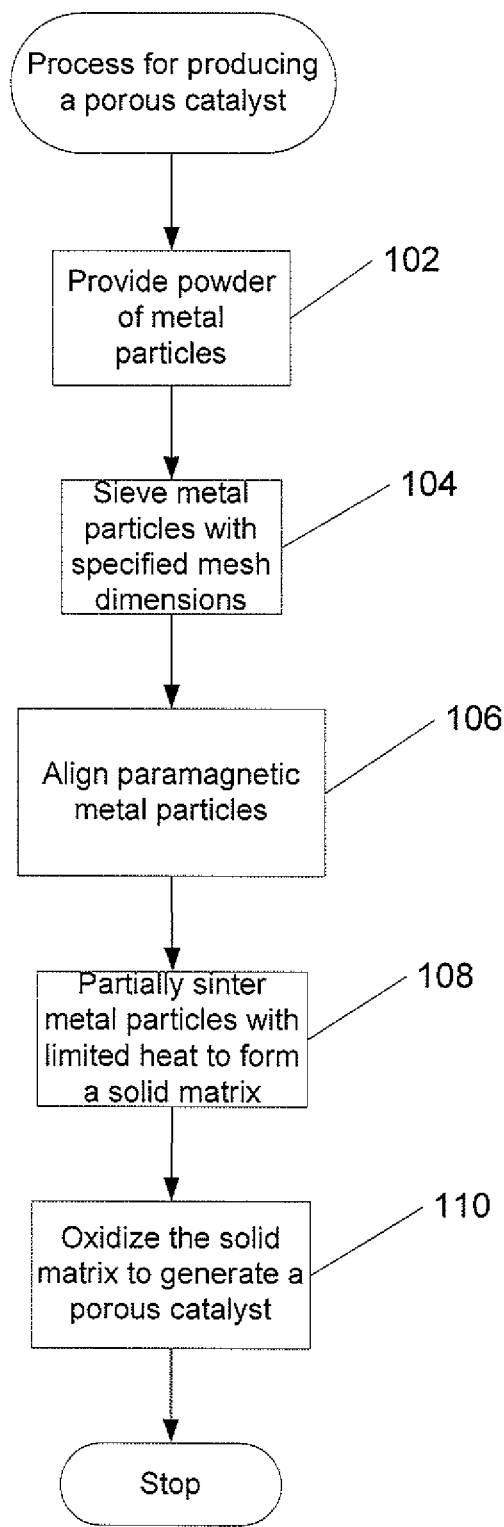
FIGS. 1A-B show flow diagrams of the disclosed methods for producing the porous catalysts.

The disclosed document is directed to processes for producing porous catalysts for the dehydrogenation of organic compounds. Dehydrogenation of organic compounds, for example, the dehydrogenation of primary amines to the corresponding nitriles, constitutes a very useful functional group transformation in organic synthesis. Dehydrogenation reactions have been carried out with a variety of reagents as catalysts. Stoichiometric metal oxidants, such as manganese dioxide, silver oxide, and nickel peroxide, NaOCl in micelles, $K_2S_2O_8$—$NiSO_4$, and CuCl—$O_2$-pyridine are generally used for this purpose. However, many drawbacks have been encountered in using these reagents, including low yields, unsatisfactory product selectivity, harsh reaction conditions, tedious preparation procedures, and other limitations. In addition, some of these reagents are corrosive, toxic, expensive, and/or difficult to produce. Consequently, there is a need for the development of new protocols to produce safe and readily available catalysts with high catalytic activity and selectivity for the dehydrogenation of organic compounds.

Porous materials are advantage as heat exchangers and molecule transporters because of their unique combination of high specific surface area and high permeability. Hydrogen produced by dehydrogenation reactions can be absorbed onto the interior surfaces of the porous catalysts and transferred away from the porous material. In the following discussion, an amine-to-nitrile dehydrogenation reaction is an example reaction used to describe the process for producing a porous catalyst:

$$RCH_2NH_2 \longleftrightarrow RCN + 2H_2$$
amine       nitrile

To achieve the forward amine-to-nitrile dehydrogenation reaction, the generated hydrogen is removed from the reaction mixtures as fast as it is produced in order to minimize contact time and eliminate the reverse reaction. The pores in the porous catalyst provide space for the generated hydrogen gas to expand and be transferred away from the catalyst. In addition, the pores provide greatly increased surface area and density of available catalyst active sites in order to facilitate a uniform reaction and lower the activation energy for the forward reaction. Properties of the porous catalyst, including surface area, pore volume, pore size, accessibility of internal voids, and interactions between molecules and the metal matrix have significant effect on the catalytic performance of porous catalysts. The currently disclosed processes provide an economic and convenient-to-implement process for producing a porous catalyst with enhanced properties in order to achieve high catalytic activity and selectivity for dehydrogenation reactions.

In the following discussions, implementations for producing porous catalysts are first described. A second subsection discusses the microstructure and composition of the resulting porous catalysts produced in the process. A third subsection includes an application of the porous catalyst to the dehydrogenation of amines to nitriles.

Preparation of the Porous Catalyst

Figure 1B:
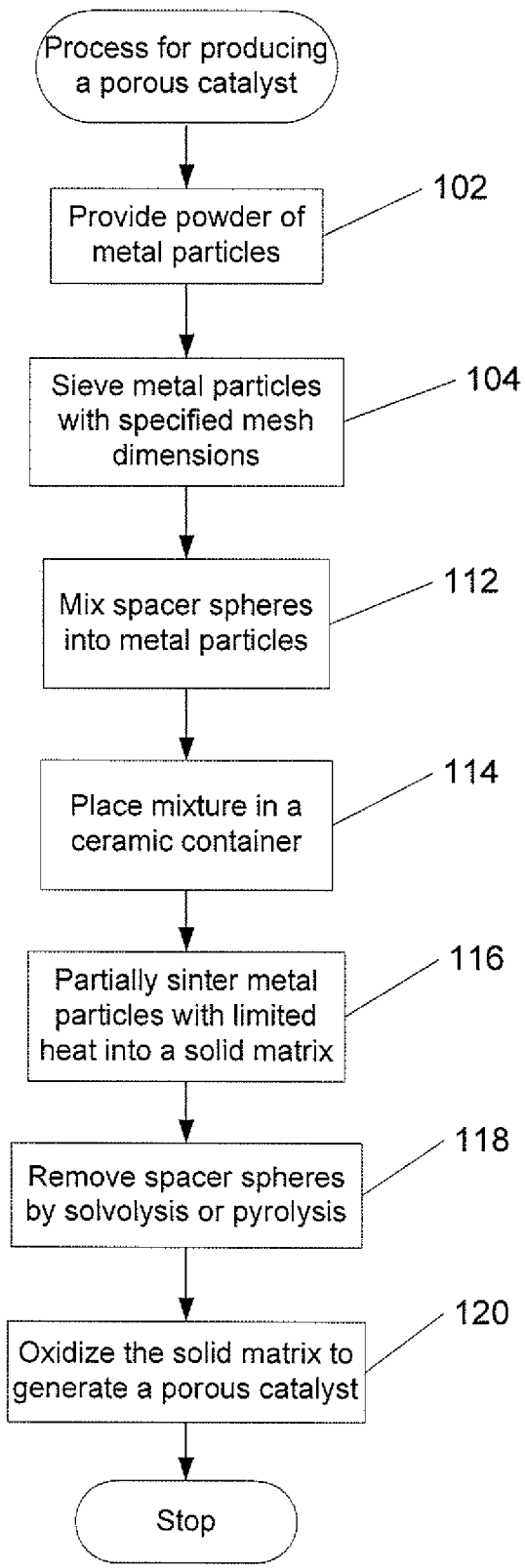

FIGS. 1A-B show flow diagrams of the disclosed methods for producing the porous catalyst. In step 102 of FIG. 1A, powdered metal particles are provided. The metal particles can be selected from a group of catalytic metal materials. For example, cobalt metal particles may be employed in one implementation. Additional types of metal particles may be used in alternative implementations to form a porous catalyst for dehydrogenation reactions.

The diversity of methods used in the manufacture of metal powders causes wide variations in particle-shape and particle-size distributions. In step 104, the metal particles are sieved using vibrating screen sieves with specified mesh-hole dimensions so that particles with smaller dimensions fall through the mesh holes onto a collection sheet. Typical diameters or shortest dimension lengths of the mesh holes in the sieves used in the process are in a range of from about 10 μm to about 200 μm. In some implementations, the mesh-hole size may range from about 50 μm to about 100 μm in diameter. In other implementations, the mesh-hole size may range from about 100 μm to about 200 μm in diameter. In other implementations, the mesh-hole size may range from about 200 μm to about 500 μm in diameter. In other implementations, the mesh-hole size may range from about 1 μm to about 1 mm in diameter. The mesh-hole dimensions can also be controlled to accommodate various geometric shapes of the metal particles, including spherical shapes, rectangular shapes, elliptical shapes, and other regular or irregular shapes.

Metal particles with spherical shapes may self-align to form an ordered matrix structure in which each sphere is in contact with adjacent spheres. Particles with complex or irregular geometric shapes may be aligned, in step 106, by applying an external magnetic field when the metal particles are paramagnetic.

Steps 104 and 106 may be repeated to form aligned layers of metal particles. The resulting metal particles are subsequently partially sintered, in step 108, in a furnace, microwave oven, or by using a laser sintering process to form a solid matrix.

The conventional method of high-temperature and long-duration sintering can generally cause the agglomeration of small metal particles into larger crystallite, reducing the number of metal particles per weight unit of the metal and, therefore, reducing the number of active sites of the catalyst. This phenomenon is a major drawback inherent in supported metal catalysts composed of small metal particles deposited on high-surface-area supports. A high degree of metal-particle agglomeration may also be accompanied by the collapse of the pore structure and loss of internal surface area, a significant cause of diminished effectiveness for supported catalysts in industrial operations.

Figure 2:
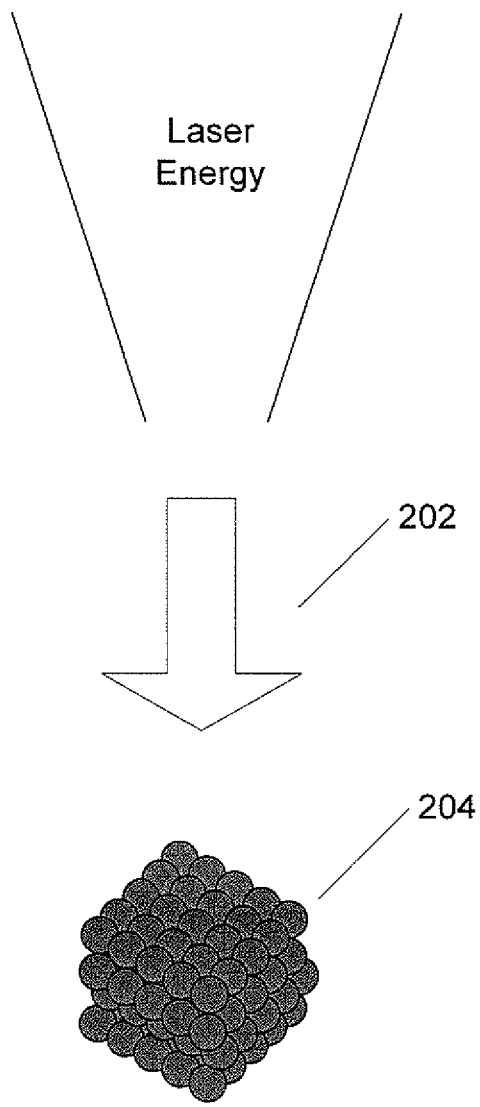
FIG. 2 is an illustration showing the metal particles placed under the laser beam.

Since the degree of sintering has a significant effect on the compact property of the catalyst, one feature of the current method is, instead of sintering the metal powder to full density, a limited or partial sintering process is used with a controlled amount of external heat, for example, at lower temperatures and/or for limited duration to prevent high-degree agglomeration of metal particles and create a continuous network of pores within the porous catalyst. For example, FIG. 2 is an illustration showing the metal particles placed under a laser beam. Using the laser sintering process, a concentrated high-energy laser beam 202 is scanned over the compacted metal particles 204 for a short interaction time, with the temperature of the metal particles maintained below their melting point. The laser-energy density is low enough not to ablate the surface of the spheres but is high enough to slightly raise the temperature to a point at which the metal particles are welded together.

In another example, a microwave heating system can be used to sinter metal particles by heating the particles with electromagnetic energy. Since the microwave heating method does not involve thermal conductivity, as in conventional heating methods, a microwave heating system sinters metal particles at a lower temperature and for a shorter duration than conventional methods, and can produce fine and more uniform microstructures. The peak temperature of the powder may range from half the melting temperature of the metal, expressed in Celsius or Fahrenheit, up to a temperature slightly below the melting point of the metal. The application of heating may last from, for example, 10 minutes to one or more hours or long enough to complete the partial sintering. Returning to FIG. 1A, the solid matrix formed by the sintering process in step 108 is then oxidized in step 110 to generate the active catalyst.

FIG. 1B shows another implementation of the disclosed method for producing porous catalysts. The powder of metal particles is provided in step 102. After sieving, in step 104, the powder of metal particles is then mixed with spacer spheres, in step 112. The spacer spheres may be made of organic polymers beads or inorganic salts, such as sodium chloride, and then sieved to a uniform size. The size of the spacer spheres is chosen so that the spacer spheres are in continuous contact with the metal particles, and is usually less than the size of the metal particles. The mixture is then placed in a ceramic container, in step 114. The mixture of spacer spheres and metal particles is heated up, in step 116, to a temperature below the melting point of the selected metal particles using a furnace, microwave oven or a laser sintering process, in order to form a matrix, as previously discussed. Following the partial sintering process in step 116, the spacers are removed either by solvolysis or by pyrolysis, in step 118. The matrix is oxidized, in step 120, to generate the active catalyst.

The second implementation shown in FIG. 1B may also aid in the prevention of metal-particle agglomeration during the elevated-temperature sintering process by mixing spacer spheres with metal particles to reduce mobility of the metal particles and to create inter-particle spacing after the spacer spheres are subsequently removed. It should be noted that the porous catalyst produced in the process does not contain any organic or inorganic binding or coating material other than the selected metal particles. Although the spacer spheres may separate individual metal particles during the sintering process to provide a thermal and physical bather that prevents drastic agglomeration, the spacer spheres are eventually removed to allow diffusion of reactant and product molecules through the internal voids and to allow catalyzed reactions to take place on the surface area of the sintered metal particles.

Structure and Composition of the Porous Catalyst

Figure 3B:
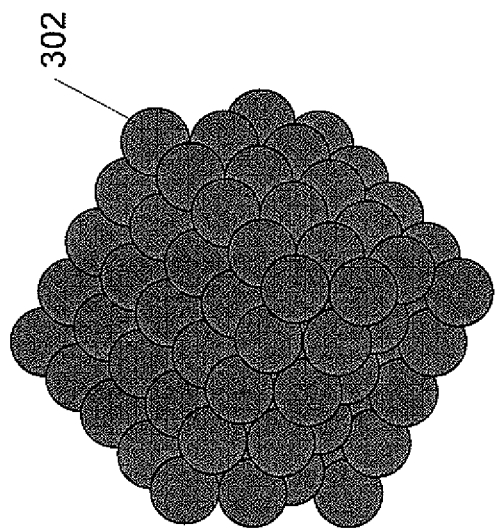
FIGS. 3A and 3B show a cross sectional view and an isometric view of a porous catalyst with layered spherical metal particles.
Figure 3A:
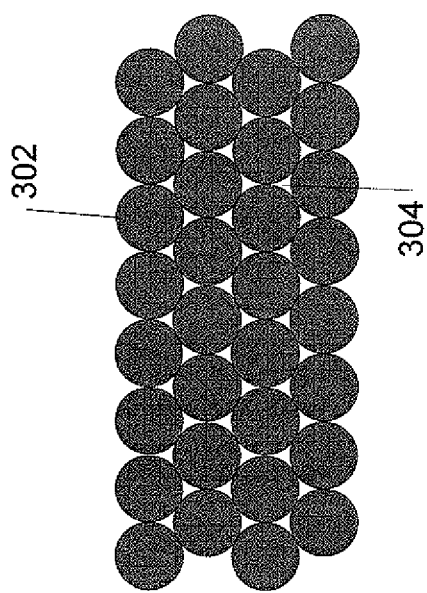

The physical characteristics and microstructures of the resulting catalyst can be easily controlled by tuning collective properties of metal particles employed in the process, including metal composition, particle size, particle-size distribution, the size and concentration of the spacer spheres, temperature, duration of the sintering process, and other properties. FIGS. 3A and 3B show a cross-sectional view and an isometric view, respectively, of a porous catalyst with layered spherical metal particles. Spacer spheres are not added in this implementation. The resulting catalyst has a cubic-crystal structure in which the metal particles 302 are arranged in an orderly three-dimensional pattern with internal voids 304 between particles.

Figure 3C:
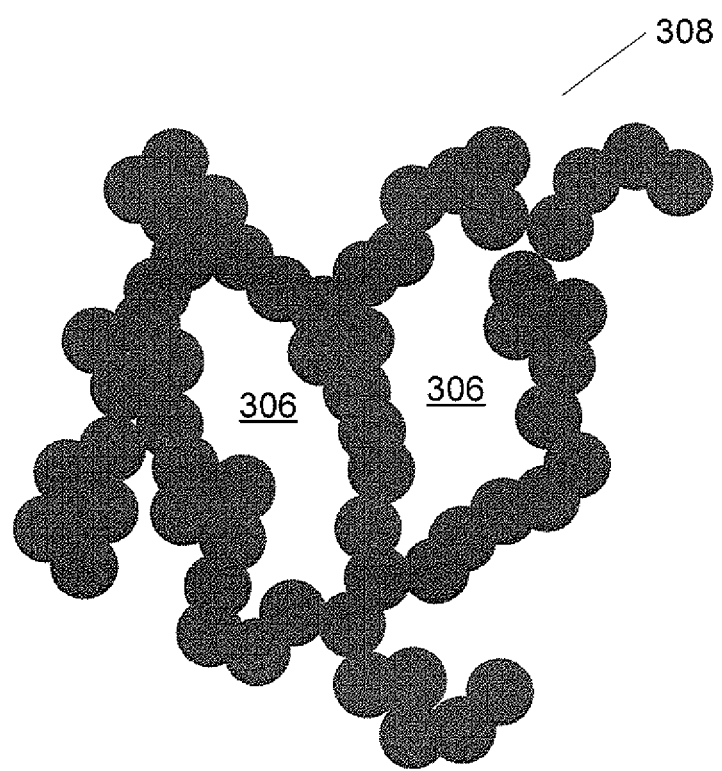
FIG. 3C shows a cross sectional view of a porous catalyst prepared using spacer spheres.

When spacer spheres are added, the ratio of the spacer-sphere concentration to the metal-particle concentration and/or the ratio of the spacer-sphere size to the metal-particle size can also be controlled. FIG. 3C shows a cross-sectional view of a porous catalyst prepared using spacer spheres. By tuning the sizes and concentrations of the metal particles and the spacer spheres, the resulting catalyst may have a sponge-like appearance, as shown in FIG. 3C. The porous catalyst features internal voids 306 throughout the volume 308 that provide a very large surface area. The internal surfaces within the internal voids 306 contribute most of the surface area to the total surface area of the porous catalyst, and the internal surfaces are assessable to both reactant and product molecules.

The porous catalyst consists essentially of oxidized metal particles selected from a variety of metal compounds. For example, cobalt is used in one implementation. It is understood that other metal particles can be used to form various alternative porous catalysts using the process disclosed in the current document. Suitable metals need to absorb molecules strongly enough to favor the forward reaction, but not so strongly that the product molecules cannot be easily removed from the surface. Owing to the weak interactions between the catalyst and the product molecules, the product molecules are able to desorb from the catalyst surface and diffuse to the exterior of the porous catalyst.

The product has a large accessible surface area that provides many active sites on which reactions are catalyzed, and that provides for the absorption of the product hydrogen molecules. The porous catalyst thus exhibits enhanced catalytic activity when compared to the corresponding metal oxides without internal voids. In some implementations, the porous catalysts may have a surface area about 2-10 times larger than the surface area of the corresponding non-porous catalysts. In other implementations, the surface area may be 10-100 times larger than that of the corresponding non-porous catalyst. In other implementations, the surface area may be 100-1000 times larger than that of the corresponding non-porous catalyst. In certain implementations, the increase in the surface area may be greater than 1000 times. The porous catalyst produced by the currently disclosed processes may achieve a catalytic activity of about 10-100 times greater than the activity of non-porous catalysts. Porous catalysts produced by alternative implementations may achieve a catalytic activity of about 100-1000 times greater than that of similar, non-porous catalysts. In certain implementations, the porous catalysts may achieve a catalytic activity greater than 1000 times.

Application of the Porous Catalyst to the Dehydrogenation of Amines to Nitriles

An application of the porous catalyst to the dehydrogenation reaction of amines to nitriles is given as an example:

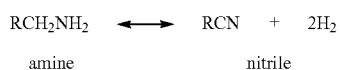

Nitriles are a prominent class of organic molecules included in a wide variety of natural products, biologically active compounds, and industrial processes. Typical synthetic methodologies to prepare nitriles use toxic reagents as reagents and harsh reaction conditions. Oxidative dehydrogenation is a common methodology used for the amine dehydrogenation reactions. But many transition-metal catalyzed oxidation processes require the addition of excess quantities of oxidant, which limits selectivity and contributes to waste products.

In contrast, the catalyzed dehydrogenation reaction of amines to nitriles using the currently-disclosed porous catalyst involves no oxidant or hydrogen-acceptor additives and releases $H_2$ as a product. The released hydrogen gas can be absorbed immediately and transported through the internal pores to prevent rehydrogenation of the nitrile back to the amine. Attributed to increased catalytic activity of the porous catalyst, the catalyzed dehydrogenation reaction may also be achieved at mild temperatures to prevent the decomposition of amines and nitriles. While detailed reaction mechanisms of the catalyzed dehydrogenation reactions may vary, the mechanism may involve rapid and reversible N—H and C—H bond dissociation steps taking place on the surfaces of the porous catalyst via the oxidized metal particles. The protocol can be further developed for prospective applications in energy-relevant transformations. For example, in the production of sustainable fuels, a system can be developed to use amines as liquid hydrogen carrier and a dehydrogenation reactor that releases hydrogen gas from the carrier by using the porous catalysts.

Although the present invention has been described in terms of particular implementations, it is not intended that the invention be limited to these implementations. Modifications will be apparent to those skilled in the art. For example, as disclosed above, the values of various process parameters, including composition of the metal particles, temperature, sintering methods, and other parameter can be changed to produce a variety of different porous catalysts.

The foregoing description, for purposes of explanation, used specific nomenclature to provide a thorough understanding of the invention. However, it will be apparent to one skilled in the art that the specific details are not required in order to practice the invention. The foregoing descriptions of specific implementations of the present invention are presented for purpose of illustration and description. They are not intended to be exhaustive or to limit the invention to the precise forms disclosed. Many modifications and variations are possible in view of the above teachings. The implementations are shown and described in order to best explain the principles of the invention and its practical applications, to thereby enable others skilled in the art to best utilize the invention and various implementations with various modifications as are suited to the particular use contemplated. It is intended that the scope of the invention be defined by the following claims and their equivalents.

The invention claimed is:

1. A process for producing a porous catalyst for the dehydrogenation of organic compounds, the process comprising:
   providing a powder of metal particles; sieving the powder of metal particles;
   aligning metal particles collected from sieving the powder of metal particles by applying an external magnetic field;
   partially sintering the aligned metal particles to form a solid matrix; and
   oxidizing the matrix to produce the porous catalyst.

2. The process of claim 1 wherein the metal particles are cobalt.

3. The process of claim 1 wherein sieving the powder of metal particles further comprises using vibrating screen sieves with a mesh-hole size ranging from about 10 µm to about 200 µm in diameter.

4. The process of claim 1 wherein partially sintering the aligned metal particles to form a solid matrix further comprises heating the aligned metal particles by using a microwave oven or by using a laser sintering process.

5. The process of claim 1 wherein the porous catalyst has a surface area 2-10 times larger than that of a catalyst without internal voids.

6. The process of claim 1 wherein the porous catalyst has a surface area 10-100 times larger than that of a catalyst without internal voids.

* * * * *